(12) United States Patent
Terunuma

(10) Patent No.: US 7,958,330 B2
(45) Date of Patent: Jun. 7, 2011

(54) COMPILER PROGRAM, COMPILER PROGRAM RECORDING MEDIUM, COMPILE METHOD, AND PROGRAM PROCESSING SYSTEM

(75) Inventor: Seiji Terunuma, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 605 days.

(21) Appl. No.: 10/770,361

(22) Filed: Feb. 2, 2004

(65) Prior Publication Data

US 2005/0138610 A1    Jun. 23, 2005

(51) Int. Cl.
*G06F 12/00* (2006.01)
*G06F 9/45* (2006.01)

(52) U.S. Cl. .......................... 711/202; 717/156
(58) Field of Classification Search ........... 717/141–144
See application file for complete search history.

(56) References Cited

U.S. PATENT DOCUMENTS

| | | | |
|---|---|---|---|
| 5,504,901 A * | 4/1996 | Peterson | 717/144 |
| 6,442,660 B1 * | 8/2002 | Henerlau et al. | 711/165 |
| 7,010,779 B2 * | 3/2006 | Rubin et al. | 717/106 |
| 7,085,789 B1 * | 8/2006 | Tarditi | 707/206 |
| 2002/0087956 A1 * | 7/2002 | Darlet | 717/159 |
| 2003/0005256 A1 * | 1/2003 | Grossman et al. | 711/202 |
| 2003/0005419 A1 * | 1/2003 | Pieper et al. | 717/141 |

OTHER PUBLICATIONS

Rosenberg et al., "The Charrette Ada Compiler", 1980, ACM, pp. 72-81.*
Séméria et al., "Resolution, Optimization, and Encoding of Pointer Variables for the Behavior for the Behavioral Synthesis from C", 2001 IEEE, pp. 213-233.*

* cited by examiner

*Primary Examiner* — Michael J Yigdall
*Assistant Examiner* — Ben C Wang
(74) *Attorney, Agent, or Firm* — Greer, Burns & Crain, Ltd.

(57) ABSTRACT

A compiler program creates a program, which is executed on a platform where use of a pointer is limited and that can perform a pointer operation without specifying addresses allocated to a memory. When a source code, which is related with the pointer operation to be executed for data having references for simultaneously identifying respective data and offset information for simultaneously specifying positions in the data identified by the references, is read, a code for performing the pointer operation using a pseudo-pointer having a predetermined data length is created by the compiler program based on information simultaneously specified by the references for identifying the data and the offset information.

5 Claims, 15 Drawing Sheets

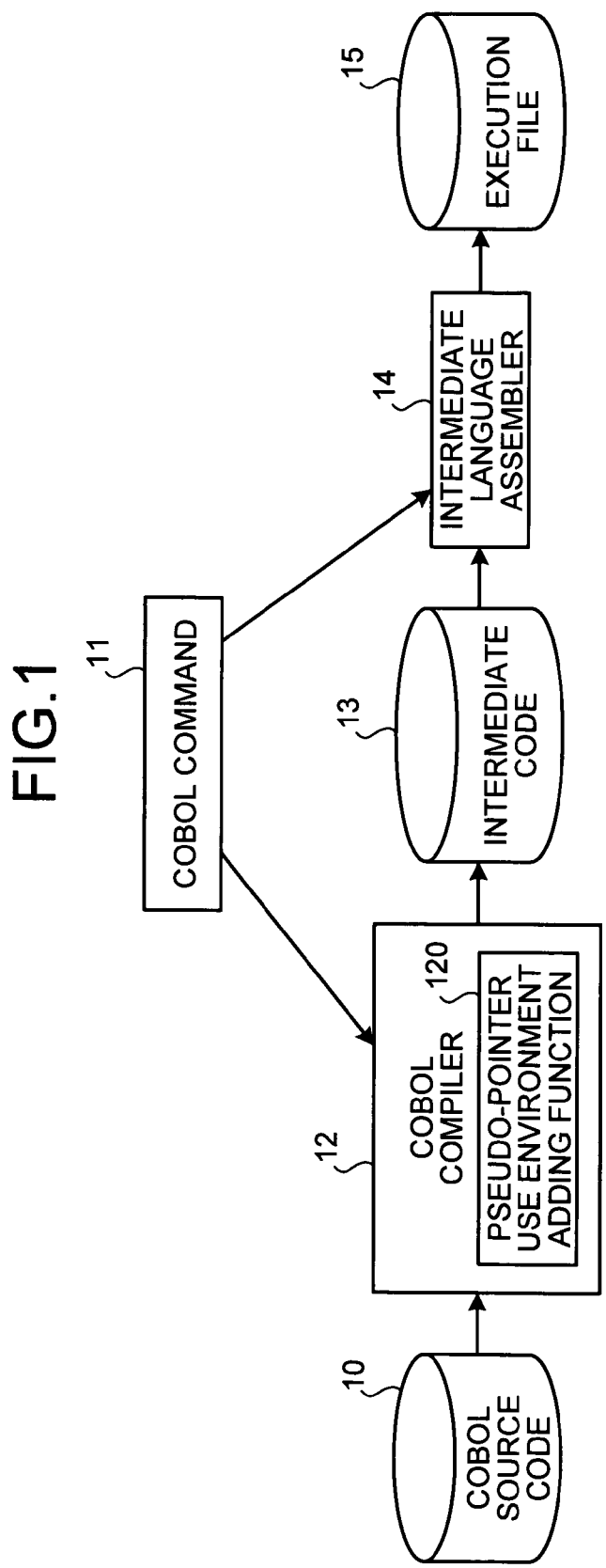

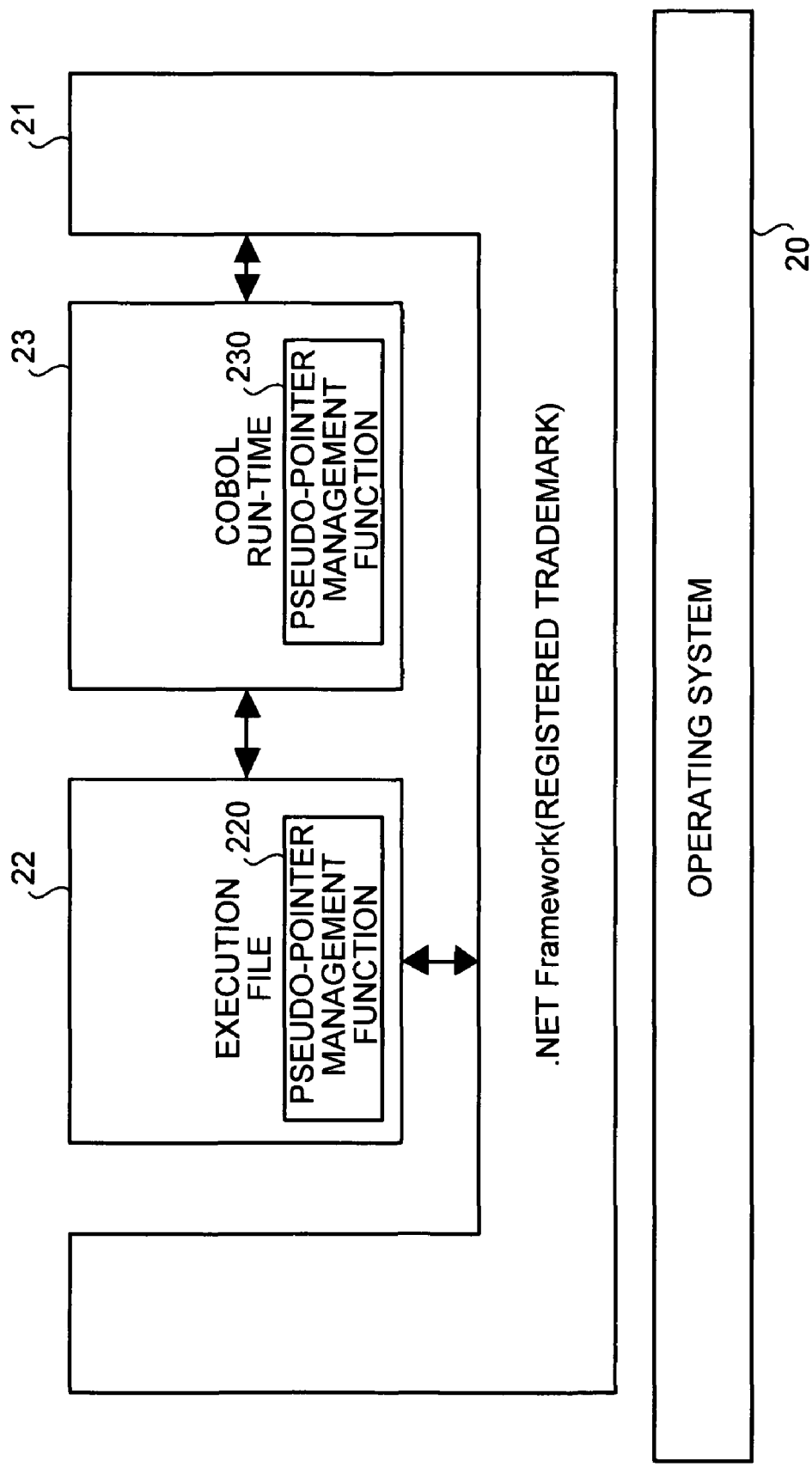

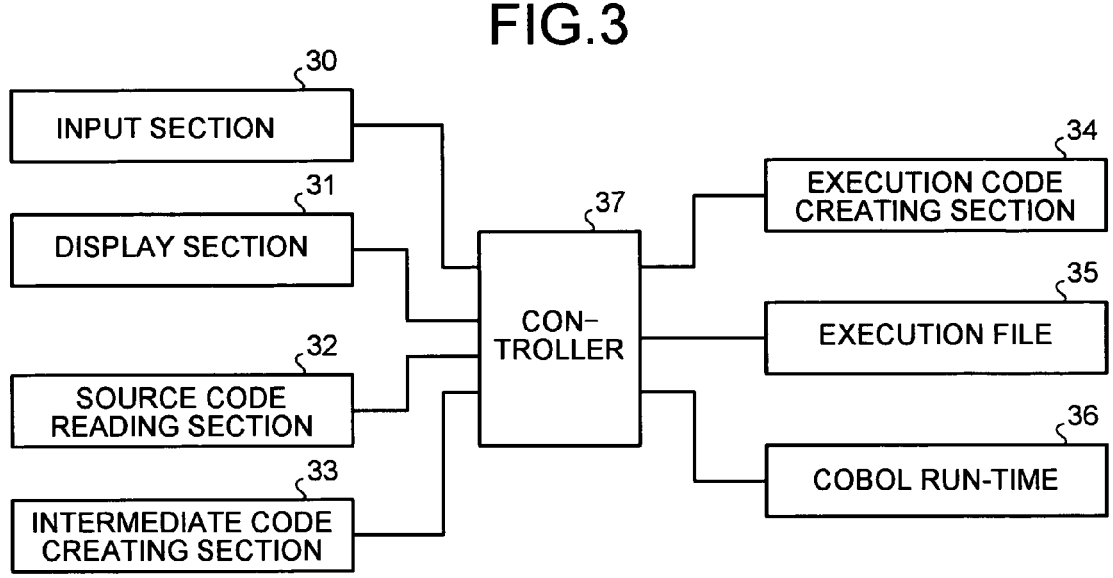
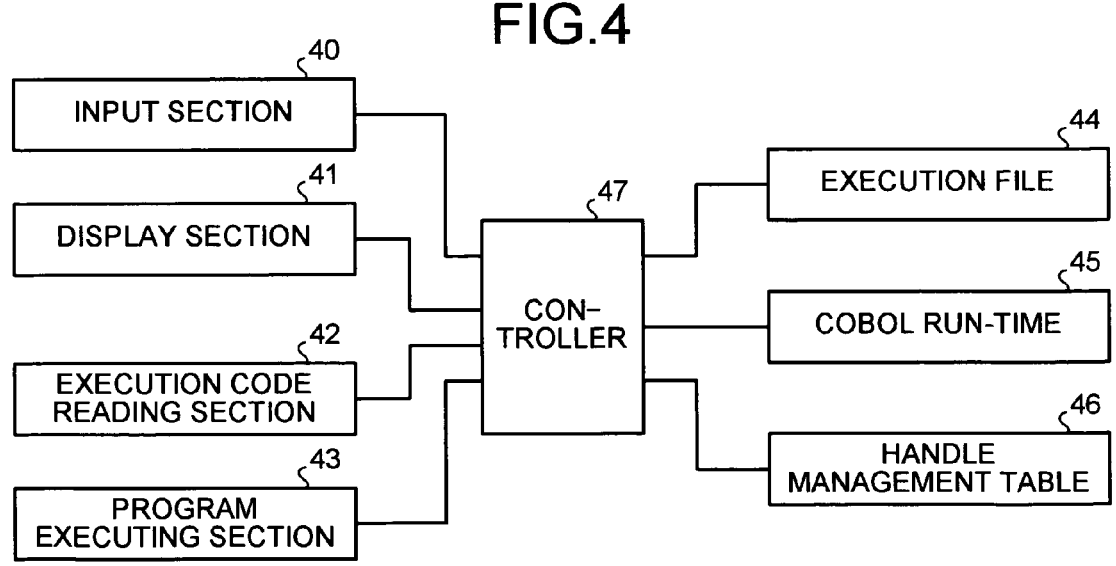

FIG.5

```
000001 IDENTIFICATION DIVISION.
000002 PROGRAM-ID. SAMPLE.
000003 DATA DIVISION.
000004 WORKING-STORAGE SECTION.
000005 01 W1.
000006    02 W11 PIC X(10) VALUE ALL "A".
000007    02 W12 PIC X(10) VALUE ALL "B".
000008 01 W2 PIC X(10) VALUE ALL "C".
000011 77 P1 USAGE POINTER.
000012 77 P2 USAGE POINTER.
000013 77 P3 USAGE POINTER.
000014 LINKAGE SECTION.
000015 01 L1 PIC X(10).
000016 01 L2 PIC X(10).
000017 PROCEDURE DIVISION.
000018     SET P1 TO ADDRESS OF W1
000019     SET P2 TO ADDRESS OF W12 OF W1
000020     SET P3 TO ADDRESS OF W2
000021     SET ADDRESS OF L1 TO P2
000022     SET ADDRESS OF L2 TO P3
000023
000024 END PROGRAM SAMPLE.
```

FIG.6

| SERIAL NUMBER | W1 | W2 | P1 | P2 | P3 | L1 | L2 |
|---|---|---|---|---|---|---|---|
| 000017 | "AAAAAAAAABBBBBBBBB" | "CCCCCCCCCC" | X"00000000" | X"00000000" | X"00000000" | | |
| 000018 | "AAAAAAAAABBBBBBBBB" | "CCCCCCCCCC" | X"00010000" | X"00000000" | X"00000000" | | |
| 000019 | "AAAAAAAAABBBBBBBBB" | "CCCCCCCCCC" | X"00010000" | X"0001000A" | X"00000000" | | |
| 000020 | "AAAAAAAAABBBBBBBBB" | "CCCCCCCCCC" | X"00010000" | X"0001000A" | X"00000000" | | |
| 000021 | "AAAAAAAAABBBBBBBBB" | "CCCCCCCCCC" | X"00010000" | X"0001000A" | X"00020000" | "BBBBBBBBB" | |
| 000022 | "AAAAAAAAABBBBBBBBB" | "CCCCCCCCCC" | X"00010000" | X"0001000A" | X"00020000" | "BBBBBBBBBB" | "CCCCCCCCCC" |

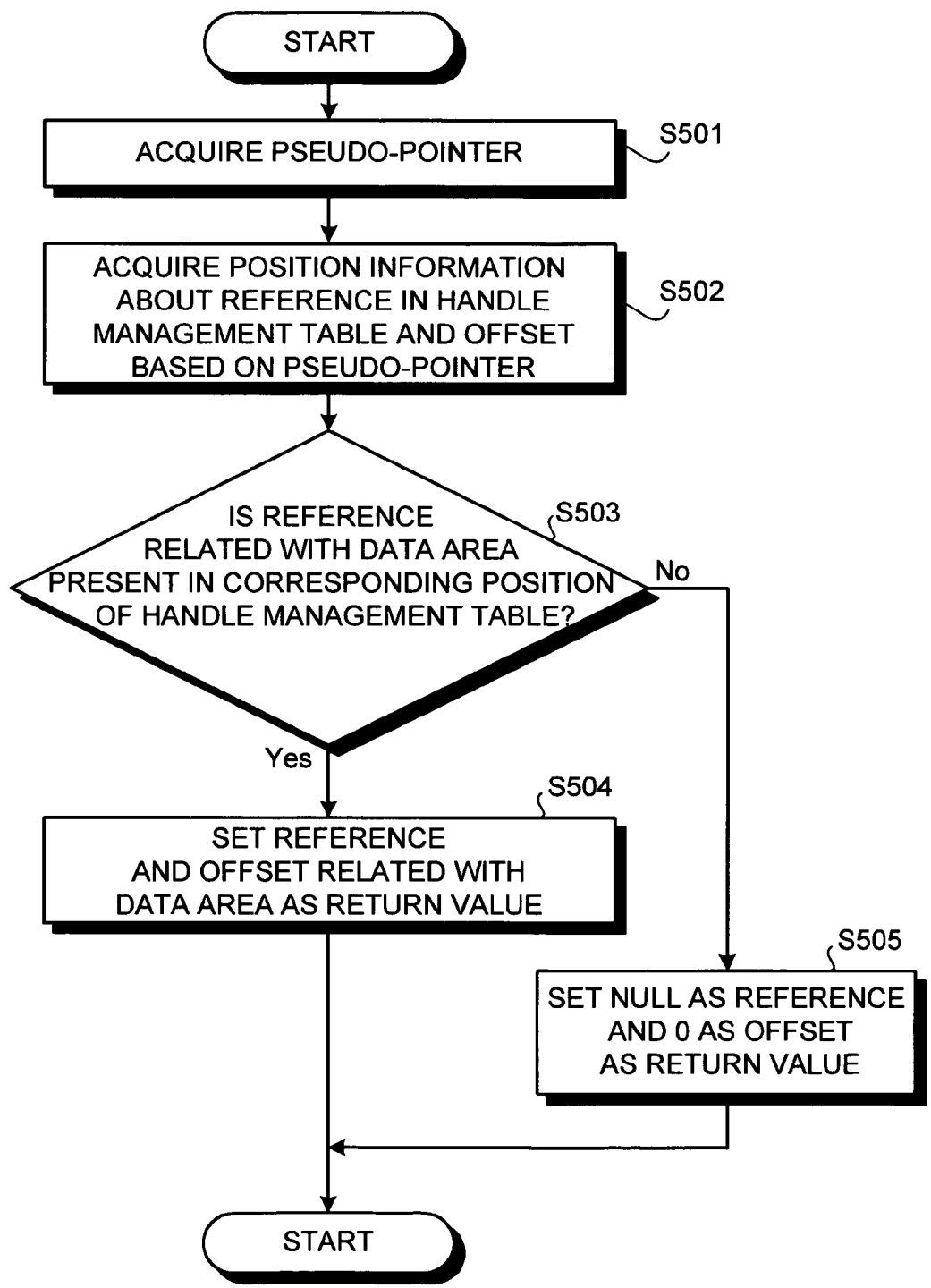

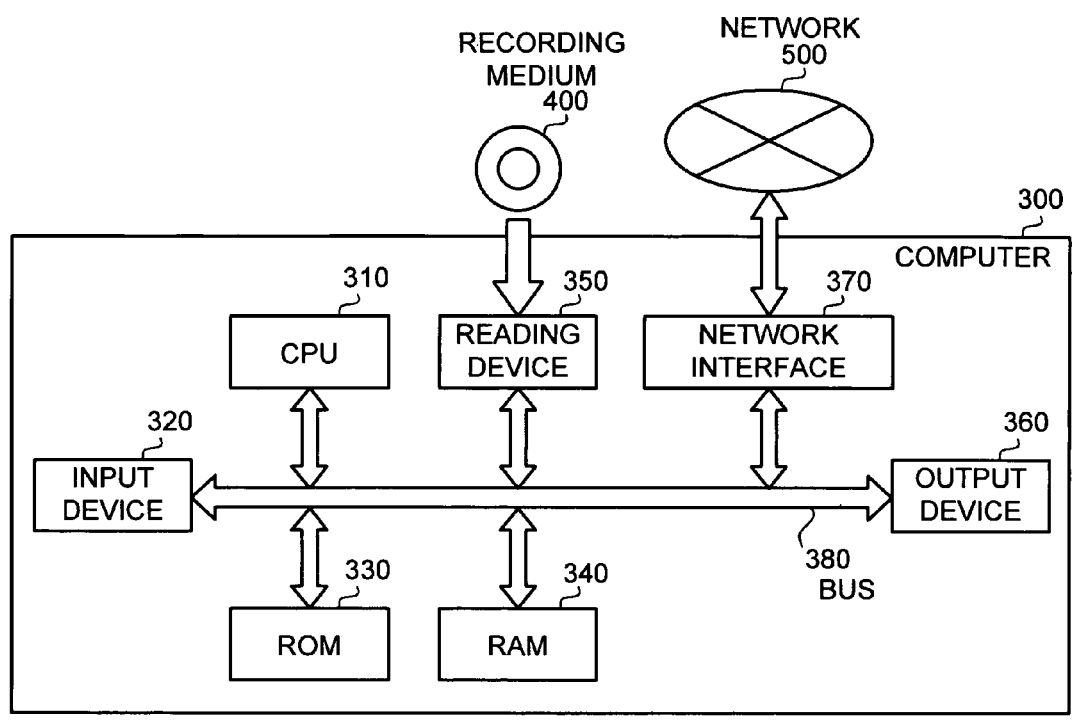

COMPILER PROGRAM, COMPILER PROGRAM RECORDING MEDIUM, COMPILE METHOD, AND PROGRAM PROCESSING SYSTEM

BACKGROUND OF THE INVENTION

1) Field of the Invention

The present invention relates to a compiler program which compiles a source code, a compiler program recording medium, a compile method, and a program processing system which compiles a source code and executes a program based on an execution code obtained by the compiling. The present invention particularly relates to the compiler program which enables an operation of a pointer while avoiding a limitation of use of the pointer when a program to be executed on a platform with the limitation of the use of the pointer uses the pointer, the compiler program recording medium, the compile method, and the program processing system.

2) Description of the Related Art

Recently, business transactions which utilize networks such as the Internet are rapidly expanding, and platforms for easily developing and operating application programs for realizing such business transactions are provided by software venders. An example of such platforms is .NET Framework (registered trademark) produced by Microsoft Corporation (for example, see non-Patent Literature 1: Microsoft Corporation ".NET Framework developers guide, Introduction to .NET Framework", [online] [searched on Jan. 27, 2004], Internet <http://www.microsoft.com/japan/msdn/library/default.asp?url=/japan/msdn/library/ja/cpguide/html/cpovrintroductiontonetframeworksdk.asp>).

The .NET Framework (registered trademark) enables development of software using a plurality of programming languages, and resources of program codes stored in the past are recycled so that the productivity of the application programs can be improved.

The .NET Framework (registered trademark) has a memory management mechanism which executes garbage collection or the like (for example, see non-Patent Literature 2: Microsoft Corporation, "Garbage collection Introduction, Automatic memory management Part I on Microsoft .NET Framework", [online] [searched on Jan. 27, 2004], Internet <http://www.microsoft.com/japan/msdn/net/mag00/GCl.asp>). The application programs, which are operated on the .NET Framework (registered trademark), are limited so that a pointer for storing addresses can be operated only within a limited range in order to avoid an influence on the memory management mechanism (for example, see non-Patent Literature 3: Microsoft Corporation ".NET Framework developers guide, typesafety and security", [online] [searched on Jan. 27, 2004], Internet <http://www.microsoft.com/japan/msdn/library/default.asp?url=/japan/msdn/library/ja/cpguide/html/cpcontypesafetysecurity.asp>).

Since the .NET Framework (registered trademark) limits the use of the pointer by a user, when the user utilizes the resources of the source codes stored in the past so as to develop application programs and use the application programs in the .NET Framework (registered trademark) described in the non-patent literature 1, the user cannot use the source codes in their original format.

Languages which are used for the development of the application programs in the business fields include common business oriented language (hereinafter, "COBOL"). In the COBOL, a command for specifying an address and operating the pointer can be used.

The source codes including the command for performing such a pointer operation, however, cannot be directly executed on the platforms such as the .NET Framework (registered trademark) which cannot use a pointer freely. For this reason, the source codes should be corrected according to the platforms.

There is desired a technique such that when a pointer is used in programs which are executed on platforms where the use of pointers is limited, the pointer can be operated while avoiding the limitation of the use of the pointer.

SUMMARY OF THE INVENTION

It is an object of the present invention to solve at least the above problems.

According to the invention, when the source code, which is related with the pointer operation to be performed for the data having the references for simultaneously identifying the data and the offset information for simultaneously specifying the positions in the data identified by the references, is read, the code for performing the pointer operation using the pseudo-pointer having a predetermined data length is created based on information simultaneously specified by the reference for identifying the data and the offset information. The execution code created based on the created code is read, and a program for performing the pointer operation by using the pseudo-pointer is executed. Since such a program is executed, when the pointer is used for the compiled program which is executed on the platform where the use of the pointer is limited, the pointer operation can be performed while avoiding the limitation of the use of the pointer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is an explanatory diagram explaining a concept of a compile process according to an embodiment;

FIG. 2 is an explanatory diagram explaining a concept of a program executing process according to the embodiment;

FIG. 3 is a functional block diagram illustrating a functional configuration of a compiler system which executes the compile process illustrated in FIG. 1;

FIG. 4 is a functional block diagram illustrating a functional configuration of a program executing system which executes the program executing process illustrated in FIG. 2;

FIG. 5 illustrates an example of a program list utilizing a pseudo-pointer;

FIG. 6 illustrates a change in a variable related with the program list illustrated in FIG. 5;

FIG. 15 is a flowchart of a process procedure for requesting the reference and offset of the data from the pseudo-pointer at the time of executing the program; and FIG. 16 is a block diagram of a computer 300 that implements respective functions of the system according to the embodiment.

DETAILED DESCRIPTION

Figure 7:
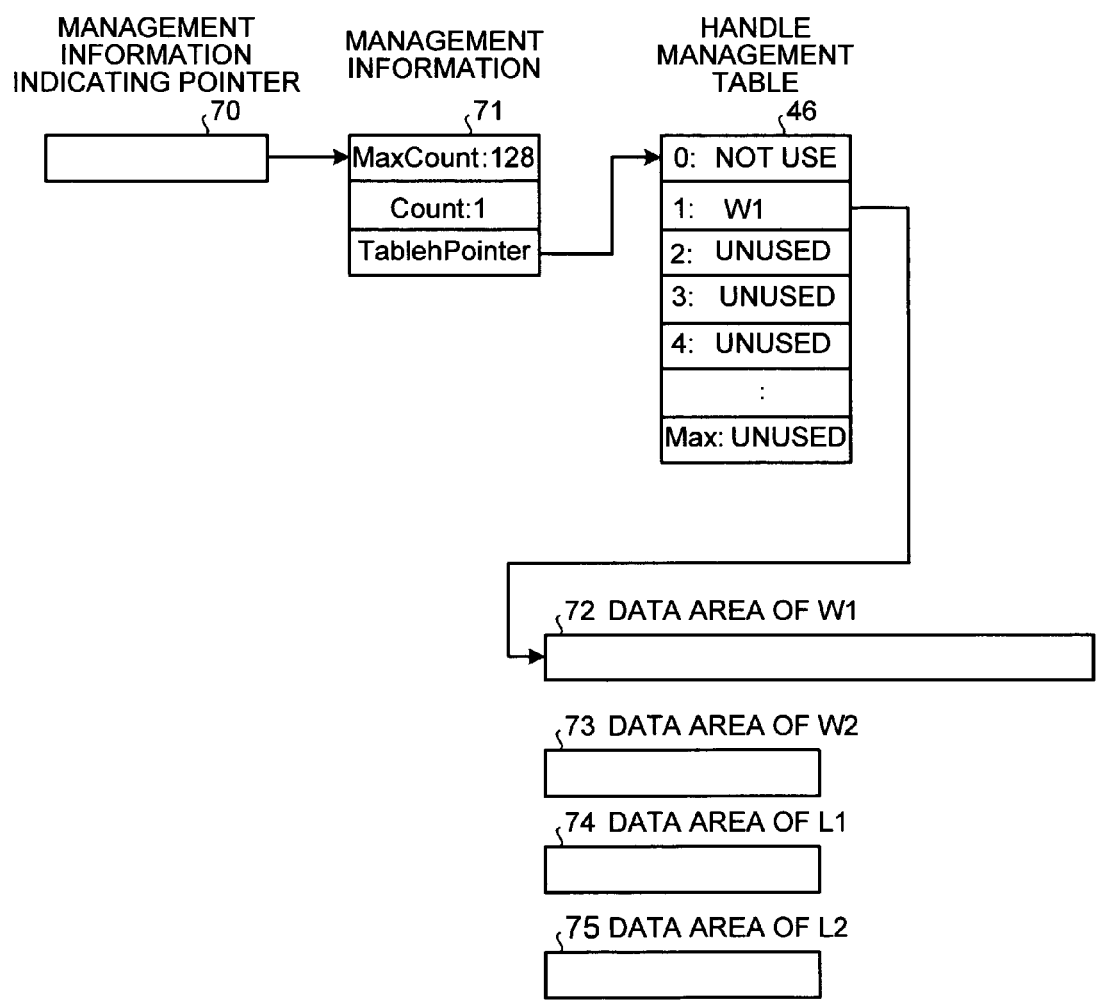
FIG. 7 is an explanatory diagram (1) explaining an operation of the pseudo-pointer related with the program list illustrated in FIG. 5.

Exemplary embodiments of a compiler program, a compiler program recording medium, a compile method, and a program processing system according to the present invention are explained below with reference to the accompanying drawings. In the embodiment, source codes which are described by the COBOL are compiled, and execution codes obtained by the compiling are utilized on .NET Framework (registered trademark) produced by Microsoft Corporation.

A concept of the compile process according to the embodiment is explained below. FIG. 1 is an explanatory diagram for explaining the concept of the compile process according to an embodiment.

As illustrated in FIG. 1, in the compile process, a COBOL compiler 12 receives a COBOL command 11 from a user, and compiles a COBOL source code 10 described by the COBOL so as to create an intermediate code 13. The intermediate code 13 copes with the .NET Framework (registered trademark), and it is called as Microsoft Intermediate Language (MSIL) (registered trademark).

At this time, the COBOL compiler 12 compiles the COBOL source code 10 and also makes a pseudo-pointer use environment adding function 120 provided to the COBOL compiler 12 execute a process for adding an environment where a pseudo-pointer can be used to the intermediate code 13.

Concretely, the COBOL compiler 12 executes a process for adding environments to the intermediate code 13. In the environments, a pseudo-pointer creating function, a pseudo-pointer referring function, a data creating function, a data releasing function, and the like can be utilized. The pseudo-pointer creating function is for, when accepting information representing a position of a data area, creating a pseudo-pointer from the information. The pseudo-pointer referring function is for, when accepting the pseudo-pointer, acquiring the information about the position of data indicated by the pseudo-pointer. The data creating function is for accepting information necessary for creating data and creating the data and a pseudo-pointer indicating the data. The data releasing function is for, when releasing a data area, accepting the pseudo-pointer indicating the data area so as to release the data and output information about whether the data are released.

In the COBOL explained in the embodiment, when data areas of respective data (called as object particularly in an object-oriented language) are indicated, a reference which identifies the data simultaneously, and offset information for specifying positions of the data in the data area identified by the reference simultaneously are used.

The pseudo-pointer includes information specified by the reference for identifying the data simultaneously, and offset which identifies the positions of the data identified by the reference simultaneously. A data length of the pseudo-pointer is the same as the size of the pointer for storing addresses conventionally used in the COBOL therein.

The use of the pseudo-pointer can realize a function which is equivalent to the pointer on a platform such as the .NET Framework (registered trademark) where the use of the pointer is limited.

The data length can be changed in order to enable the pseudo-pointer which is the problem of the present invention, but when past resources of source codes are diverted, an influence on the program for managing the size of the data should be examined in order to improve the usability of a memory. When the data length of the pseudo-pointer is made to match the data length of a pointer, it is not necessary to examine the influence on the program. As a result, the resources of the past source codes can be easily utilized. The pseudo-pointer is further detailed later.

The created intermediate code 13 is converted into an execution file 15 by an intermediate language assembler 14 actuated by the COBOL command 14 sent from the user. The execution file 15 includes software modules such as run-time.

A concept of a program executing process according to the embodiment is explained below. FIG. 2 is an explanatory diagram explaining the concept of the program executing process according to the embodiment.

As illustrated in FIG. 2, in the program executing process, an execution file 22 which is created by the compile process illustrated in FIG. 1 is executed while utilizing COBOL run-time 23 created by the compile process illustrated in FIG. 1 in the environment of the .NET Framework (registered trademark) which operates on an operating system 20 such as Windows (registered trademark) produced by Microsoft Corporation.

The execution file 22 and the COBOL run-time 23 have a pseudo-pointer management function 220 and a pseudo-pointer management function 230, respectively. The use of the pseudo-pointers, thus, can realize the function which is equivalent to a pointer even on the platform such as the .NET Framework (registered trademark) where the use of the pointer is limited.

A functional configuration of the compiler system which executes the compile process illustrated in FIG. 1 is explained below. FIG. 3 is a functional block diagram illustrating the functional configuration of the compiler system which executes the compile process illustrated in FIG. 1.

As illustrated in FIG. 3, the compiler system has an input section 30, a display section 31, a source code reading section 32, an intermediate code creating section 33, an execution code creating section 34, an execution file 35, a COBOL run-time 36, and a controller 37.

The input section 30 is an input device such as a keyboard and a mouse. The display section 31 is a display device. The source code reading section 32 reads source codes to be compiled.

The intermediate code creating section 33 compiles the source codes read by the source code reading section 32 so as to create intermediate codes. When the source code reading section 32 reads a source code relating to the pointer operation, the intermediate code creating section 33 creates an intermediate code which realizes a function equivalent to a normal pointer using a pseudo-pointer.

The execution code creating section 34 compiles the intermediate code created by the intermediate code creating section 33 so as to create and store the execution file 35 and the COBOL run-time 36.

The execution file 35 and the COBOL run-time 36 are created and stored by the execution code creating section 34. The controller 37 controls the entire compiler system so as to control transmission/reception of data between the functioning sections.

A functional configuration of a program executing system which executes the program executing process illustrated in FIG. 2 is explained below. FIG. 4 is a functional block diagram illustrating the functional configuration of the program executing system which executes the program executing process illustrated in FIG. 2.

As illustrated in FIG. 4, the program executing system has an input section 40, a display section 41, an execution code reading section 42, a program executing section 43, an execution file 44, a COBOL run-time 45, a handle management table 46, and a controller 47.

The input section 40 is an input device such as a keyboard and a mouse. The display section 41 is a display device. The execution code reading section 42 reads an execution code of a program to be executed from the execution file 44 or the COBOL run-time 45.

The program executing section 43 executes a program according to the execution code read by the execution code reading section 42. When the execution code reading section 42 reads the execution code relating to the pointer operation, the program executing section 43 realizes the pointer operation equivalent to a normal pointer using the pseudo-pointer.

The execution file 44 and the COBOL run-time 45 are created by the compiler system illustrated in FIG. 3. The execution file 44 and the COBOL run-time 45 are compiled so as to be able to perform an operation equivalent to the operation of the normal pointer using the pseudo-pointer.

The handle management table 46 is a table into which a reference for identifying data is stored (reference storage area). The pseudo-pointer includes information about a position of the handle management table 46 where the reference of the data is stored, and information about offset. The pseudo-pointer realizes the function which is equivalent to a normal pointer. Hereinafter, the information about the storage positions are called as handle information.

The controller 47 controls the entire program executing system so as to control transmission/reception of the data between the functioning sections.

The compile system which compiles source codes and the program executing system which executes programs are provided individually. The present invention is not, however, limited to this, and one system may compile source codes and execute programs.

The handle management table 46 and the pseudo-pointer are further detailed below. FIG. 5 illustrates one example of a program list using the pseudo-pointer, and FIG. 6 illustrates a change in variables related with the program list illustrated in FIG. 5. FIGS. 7 to 10 are explanatory diagrams (1) to (4) explaining the operation of the pseudo-pointer related with the program list illustrated in FIG. 5.

FIG. 5 illustrates the program list described by the COBOL. In the COBOL, serial numbers for identifying respective lines of the program list are described on the left side of the program list, and respective commands are described on the right side of the program list. Processes which are executed by the commands related with the pointer operation illustrated by the serial numbers 000017 to 000022 are explained with reference to FIGS. 5 to 10.

"PROCEDURE DIVISION" is described in the command of serial number 000017. This represents that the command for operating data is described thereafter. As illustrated in FIG. 6, when the command of serial number 000017 is executed, a variable W1 is set to "AAAAAAAAAABBBBBBBBBB", and a variable W2 is set to "CCCCCCCCCC". A pointer variable P1, a pointer variable P2, and a pointer variable P3 are set to X"00000000" which is an initialized value.

The command of serial number 000018 "SET P1 TO ADDRESS OF W1" sets an address of variable W1 to the pointer variable P1. In this embodiment, not a normal address but a value of the pseudo-pointer indicating the variable W1 is set to the pointer variable P1.

FIG. 7 illustrates a management information indicating pointer 70 which indicates a position of management information about certain data, management information 71 as recorded management information about data, a handle management table 46, and data areas 72 to 75 of the variables W1, W2, L1, and L2. The management information indicating pointer 70, the management information 71, and the handle management table 46 are stored into a memory as internal table which is not directly handled by a user.

Information "Max Count" about a number of references (a number of recordable handle information) recordable into the handle management table 46, information "Count" about a number of references currently recorded in the handle management table 46 (a number of handle information corresponding to the references), and a pointer "TablehPointer" indicating a head of the handle management table 46 are recorded into the management information 71. In this example, since "Max Count" is "128", and the reference currently recorded is only a reference for variable W1, "Count" is "1".

When the address of the variable W1 is set to the pointer variable P1 according to the command "SET P1 TO ADDRESS OF W1", the information about the storage position of the reference of W1 in the handle management table 46 recorded in the handle management table 46 is acquired as the handle information. A pseudo-pointer is created based on the acquired handle information and the offset information related with the variable W1, and this value is set to the pointer variable P1.

FIG. 6 illustrates values of the variables after the command of serial number 000018 is executed. The value of the pointer variable P1 is X"00010000", and this value is a value of the created pseudo-pointer. As to the value of the pseudo-pointer, top 2 bytes X"0001" is a value of the handle information acquired from the handle management table 46, and low 2 bytes X"0000" is a value of the offset. The size of the pseudo-pointer is determined to 4 bytes, but this size conforms to the size of the pointer which stores the addresses used in the COBOL.

The command "SET P2 TO ADDRESS OF W12 OF W1" of serial number 000019 illustrated in FIG. 5 sets an address of the variable W12 belonging to the data area of the variable W1 to the pointer variable P2. A character string "AAAAAMAAABBBBBBBBBB" is set to the variable W1, and as described in the commands of serial numbers 000006 and 000007, a character string "AAAAAAAAAA" is set to the variable W11. Further, a character string "BBBBBBBBBB" is set to the variable W12.

When the address of the variable W12 is set to the pointer variable P1 according to the command "SET P2 TO ADDRESS OF W12 OF W1", the information about the storage position of the reference of the variable W1 in the handle management table 46 recorded in the handle management table 46 is acquired as the handle information. A pseudo-pointer is created based on the acquired handle information and the offset information corresponding to the variable W1, and this value is set to the pointer variable P2.

In this example, since the value of the handle information of variable W1 is X"0001" and the value of the offset in the data area of variable W12 is X"000A", as illustrated in FIG. 6, the value X"0001000A" is set as the value of the pseudo-pointer to the pointer variable P2.

The handle information (reference) which is the same as that of variable W1 is related with the data area of the data stored in the variable W12 which is a part of the data area of the data stored in the variable W1. For this reason, a number of the handle information (references) managed in the handle management table 46 is reduced, and thus the management becomes easy, and the handle information (reference) is searched at a high speed.

The command "SET P3 TO ADDRESS OF W2" of serial number 000020 illustrated in FIG. 5 is similar to the command of serial number 000018, and it is for setting the address of variable W2 to the pointer variable P3.

Figure 8:
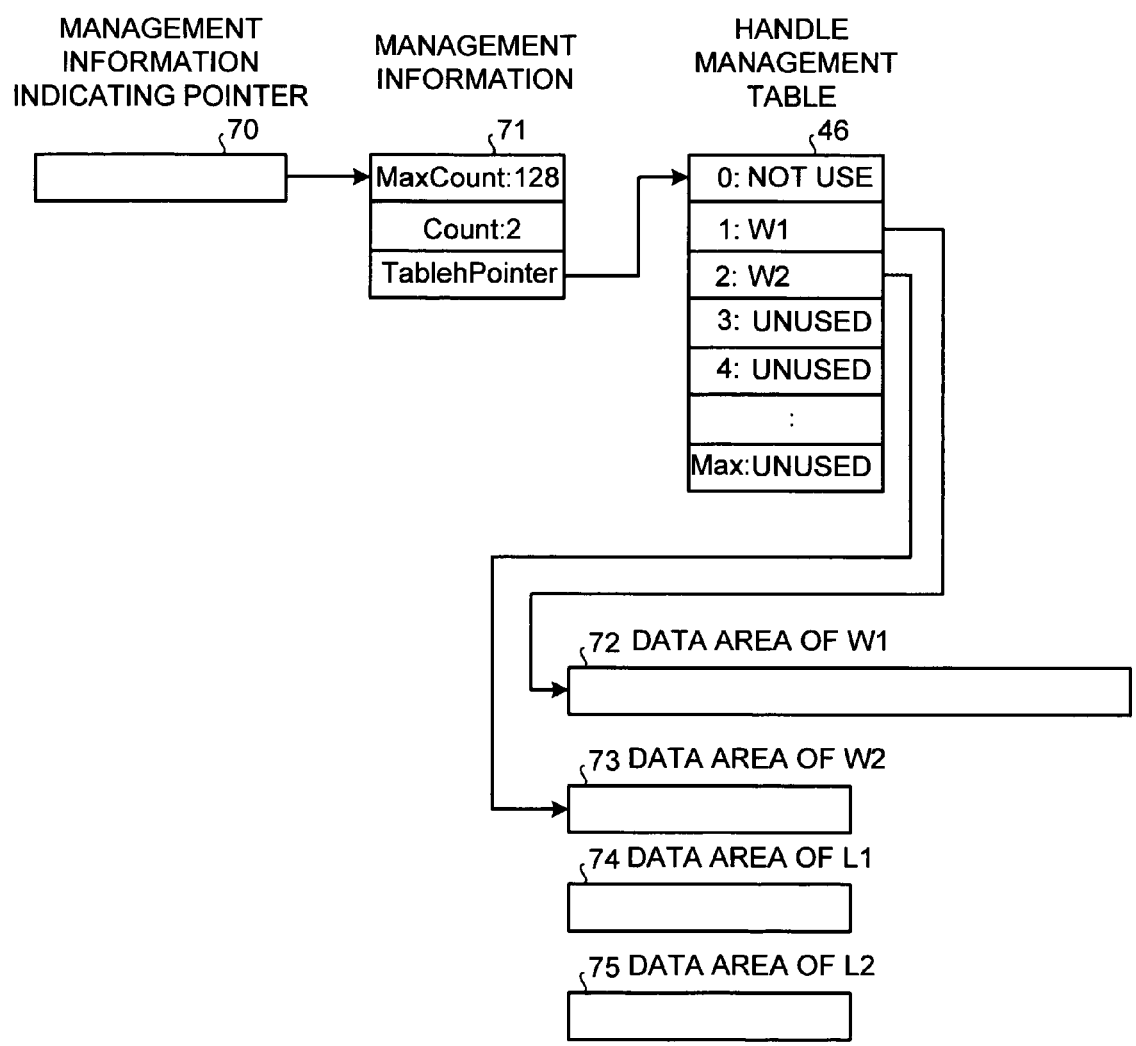
FIG. 8 is an explanatory diagram (2) explaining the operation of the pseudo-pointer related with the program list illustrated in FIG. 5.

FIG. 8 illustrates a status that the reference of variable W2 is recorded in the handle management table 46. When the reference of variable W2 is recorded, the value of "Count" in the management information 71 indicates "2".

In this case, similarly to the case of variable W1 illustrated in FIG. 7, the information about the storage position of the reference of variable W2 recorded in the handle management table 46 is acquired as the handle information. A pseudo-pointer is created based on the acquired handle information and the offset information corresponding the variable W2, and this value is set to the pointer variable P3.

FIG. 6 illustrates the values of the respective variables after the command of serial number 000020 is executed. The value of the pointer variable P3 is X"00020000", and this value is a value of the created pseudo-pointer. The value of the pseudo-pointer means that the value of the handle information acquired from the handle management table 46 is X"0002", and the offset value of the data area of variable W2 is X"0000".

The command "SET ADDRESS OF L1 TO P2" of serial number 000021 illustrated in FIG. 5 is for setting the value stored in the pointer variable P2 as the address of the variable L1. The value of the pseudo-pointer corresponding to the variable W12 is already set to the pointer variable P2 according to the command of serial number 000019.

Figure 9:
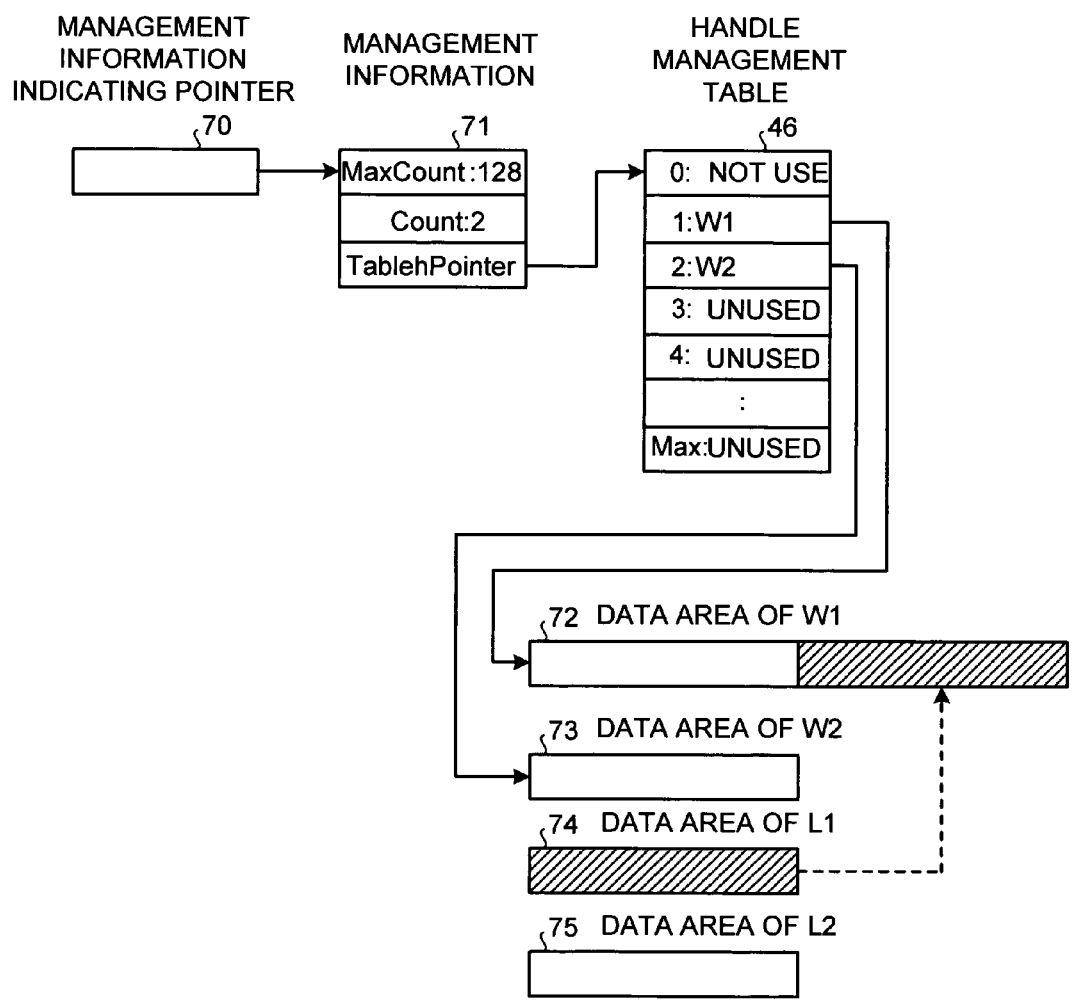
FIG. 9 is an explanatory diagram (3) explaining the operation of the pseudo-pointer related with the program list illustrated in FIG. 5.
Figure 10:
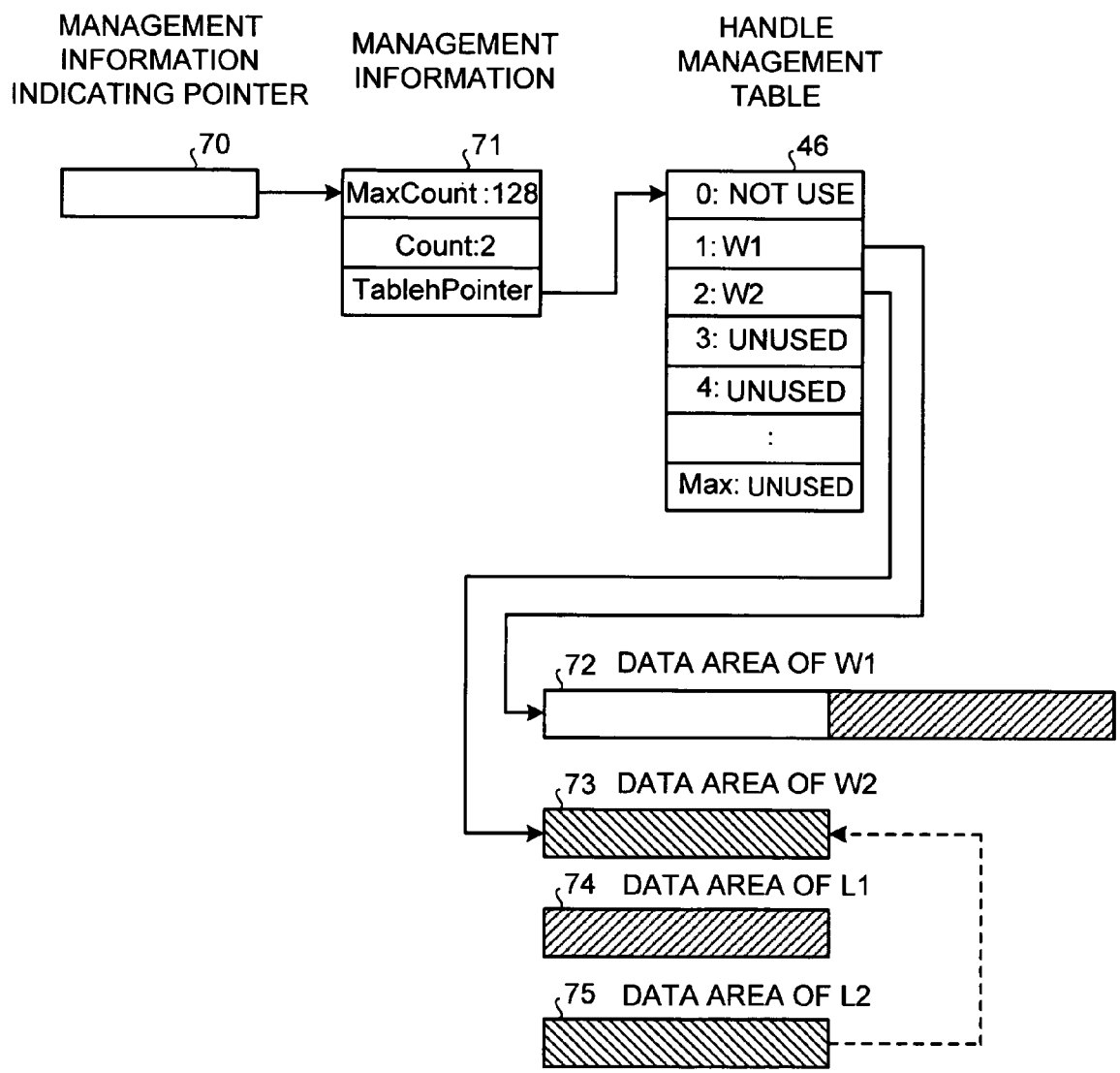
FIG. 10 is an explanatory diagram (4) explaining the operation of the pseudo-pointer related with the program list illustrated in FIG. 5.

This value is set as the address of the variable L1, so that, as illustrated in FIG. 9, the data area related with the variable W12 can be indicated by using the variable L1. That is, as illustrated in FIG. 6, the variable L1 can indicate the data "BBBBBBBBBB" of variable W12.

The command "SET ADDRESS OF L2 TO P3" of serial number 000022 illustrated in FIG. 5 is similar to the command of serial number 000021, and it is for setting the value stored in the pointer variable P3 as the address of the variable L2. The value of the pseudo-pointer corresponding to the variable W2 is already set to the pointer variable P3 according to the command of serial number 000020.

This value is set as the address of the variable L2, so that as illustrated in FIG. 9, the data area related with the variable W2 can be indicated by using the variable L2. That is, as illustrated in FIG. 6, the variable L2 can indicate the data "CCCCCCCCCC" of variable W2.

In the embodiment, the pseudo-pointer is used so that the function which is equivalent to a pointer can be realized on the platform such as the .NET Framework (registered trademark) where the use of the pointer is limited.

Figure 11:
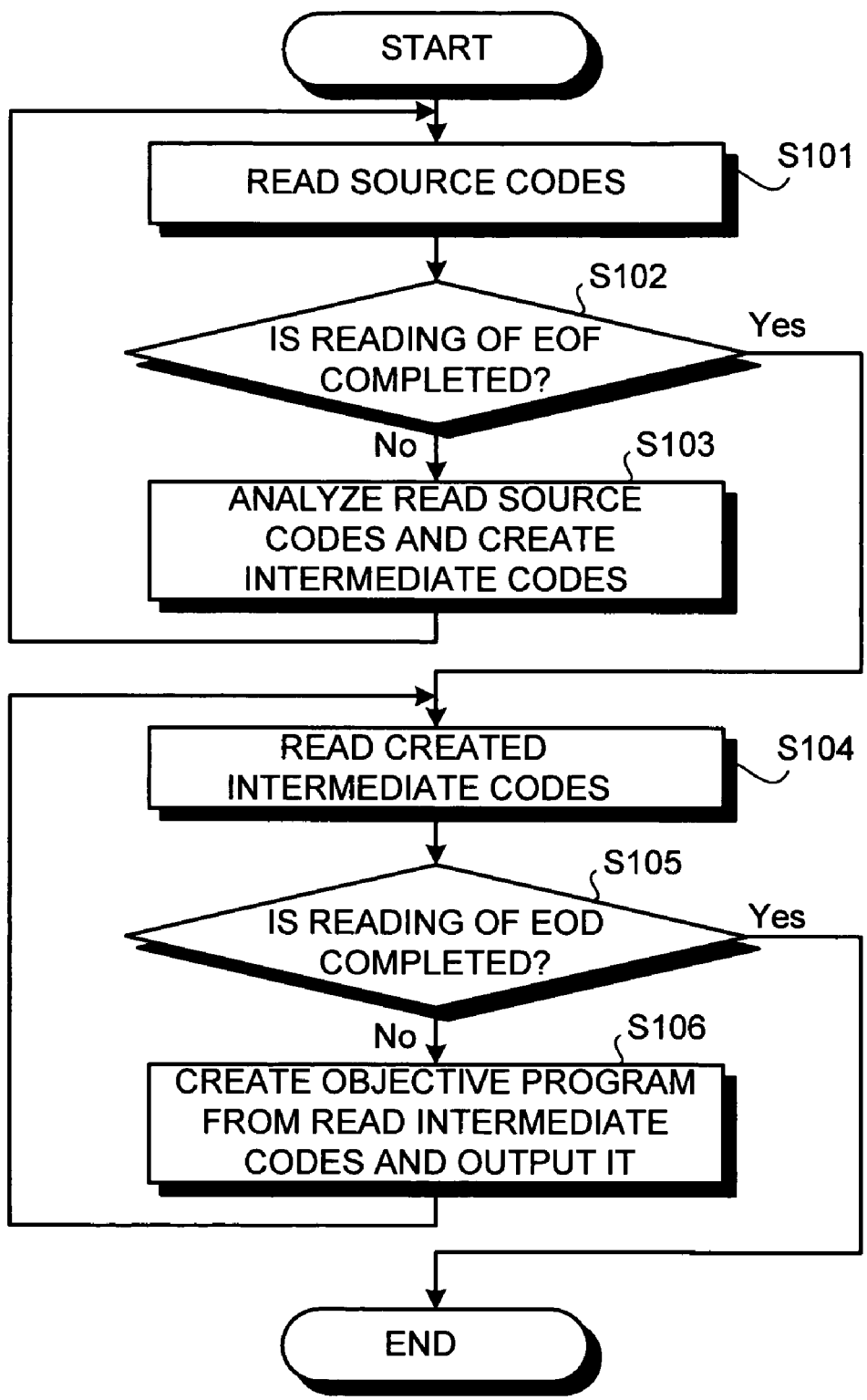
FIG. 11 is a flowchart of a process procedure of the compile process according to the embodiment.

The procedure of the compile process according to the embodiment is explained below. FIG. 11 is a flowchart illustrating the procedure of the compile process according to the embodiment. As illustrated in FIG. 11, the source code reading section 32 of the compiler system illustrated in FIG. 3 reads source codes described by the COBOL (step S101).

The source code reading section 32 checks whether the reading of an EOF (End of File) code representing end of the source codes ends (step S102). When the reading of the EOF code is not completed (step S102: No), the intermediate code creating section 33 analyzes the read source codes so as to create intermediate codes. The sequence thereafter proceeds to step S101, so that the source code reading section 32 reads the next source code.

When it is determined at step S102 that the reading of the EOF code is completed (step S102: Yes), the execution code creating section 34 reads the intermediate codes created by the intermediate code creating section 33 (step S104).

The execution code creating section 34 checks whether reading of an EOD (End of Data) code representing end of data in the intermediate codes is completed (step S104). When the reading of the EOD code is not completed (step S104: No), the execution code creating section 33 creates an objective program from the read intermediate codes so as to output it (step S106).

The sequence, thereafter, proceeds to step S104, so that the execution code creating section 34 reads the next intermediate code. When it is determined at step S105 that the reading of the EOD code is completed (step S105: Yes), the compile process ends.

Figure 12:
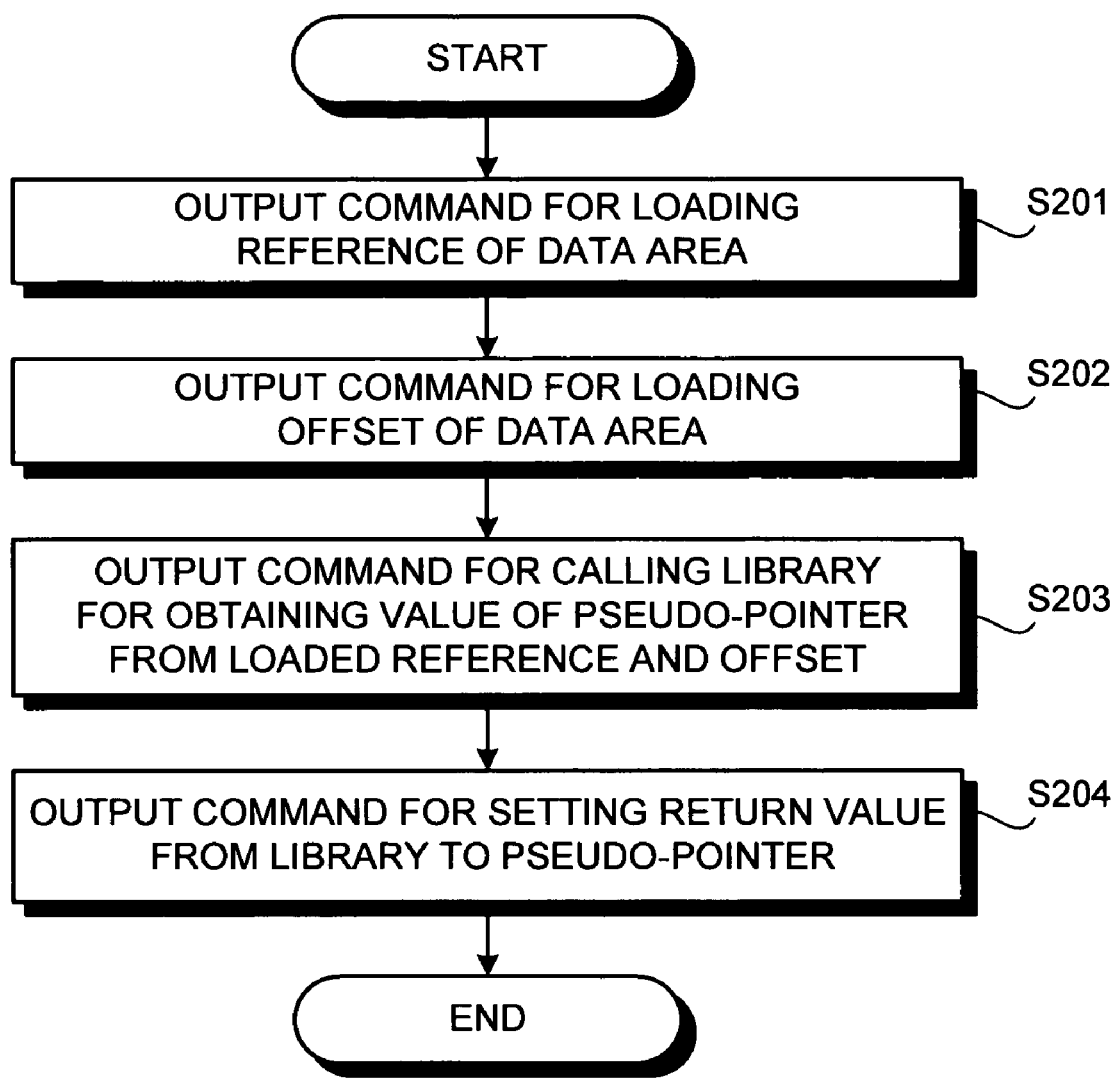
FIG. 12 is a flowchart of a process procedure for adding a creating function of the pseudo-pointer at the time of compiling.

A procedure of the process for adding the pseudo-pointer creating function at the time of compiling is explained below. FIG. 12 is a flowchart illustrating the procedure of the process for adding the pseudo-pointer creating function at the time of compiling. This process is executed when a source code related with the pointer operation is compiled.

As illustrated in FIG. 12, the intermediate code creating section 33 of the compiler system illustrated in FIG. 3 outputs a command for loading a reference of a data area of the data for creating a pseudo-pointer into a memory (step S201). The intermediate code creating section 33 outputs a command for loading offset of the data area into the memory (step S202).

The intermediate code creating section 33 obtains a value of the pseudo-pointer from the reference and the offset of the data area loaded into the memory, and outputs a command for calling a library to which the value of the obtained pseudo-pointer is returned as a return value (step S203). A process to be executed by the library is detailed later with reference to FIG. 14. The intermediate code creating section 33 outputs a command for setting the return value from the library to the pseudo-pointer (step S204).

Figure 13:
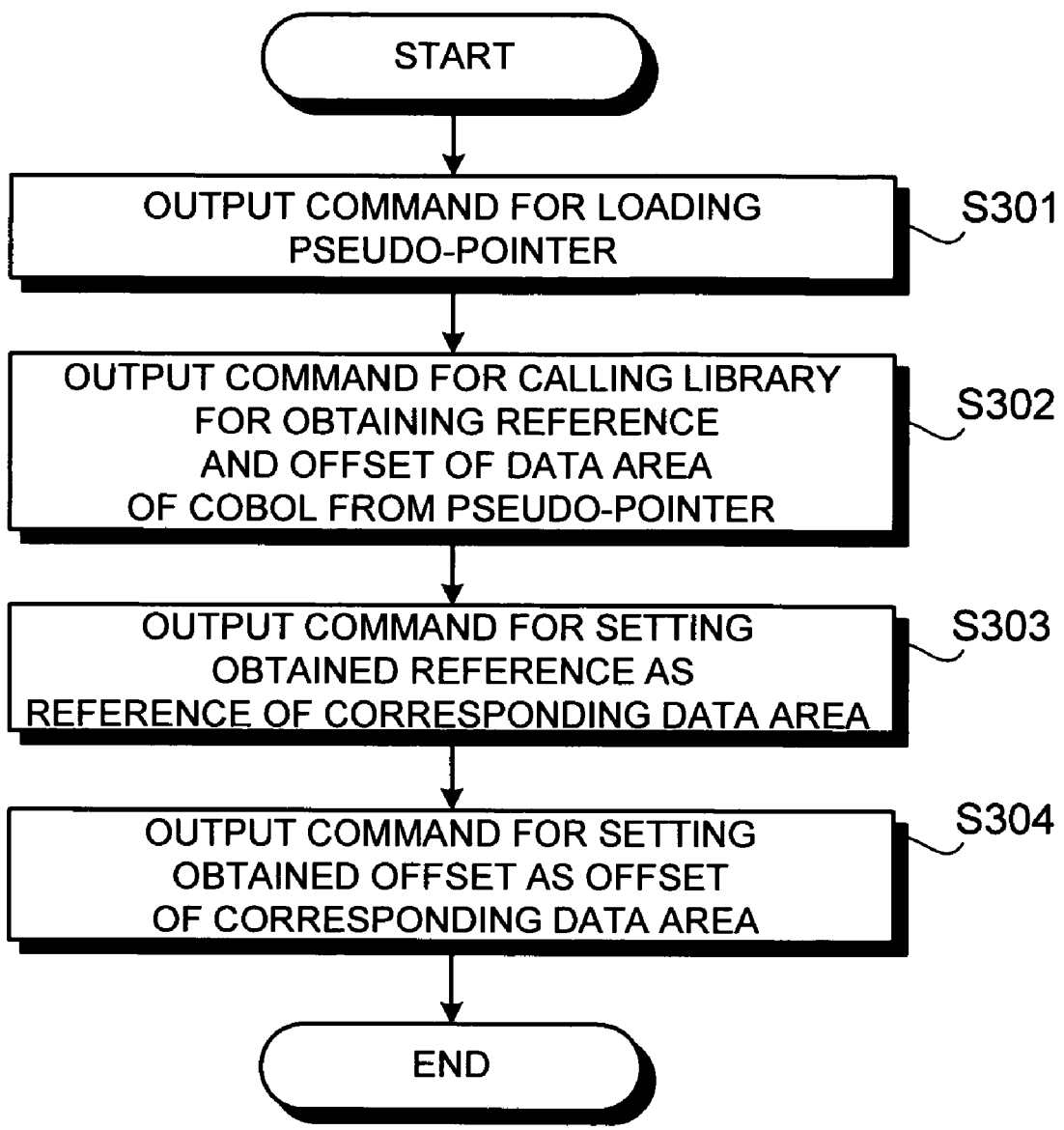
FIG. 13 is a flowchart of a process procedure for adding a function of requesting reference and offset of data from the pseudo-pointer at the time of compiling.

A procedure of the process for adding a function of obtaining reference and offset of data based on the pseudo-pointer at the time of compiling is explained below. FIG. 13 is a flowchart illustrating the procedure of the process for adding the function of obtaining reference and offset of data based on the pseudo-pointer at the time of compiling.

As illustrated in FIG. 13, the intermediate code creating section 33 of the compiler system illustrated in FIG. 3 outputs a command for loading a pseudo-pointer indicating the data area of COBOL for obtaining reference and offset based on the pseudo-pointer (step S301).

The intermediate code creating section 33 outputs a command for calling the library for obtaining the reference and offset in the data area of COBOL from the pseudo-pointer (step S302). The process to be executed by the library is detailed later with reference to FIG. 15.

The intermediate code creating section 33 outputs a command for setting the obtained reference as a reference of the corresponding data area (step S303). Further, the intermediate code creating section 33 outputs a command for setting the obtained offset as offset of the corresponding data area (step S304).

Figure 14:
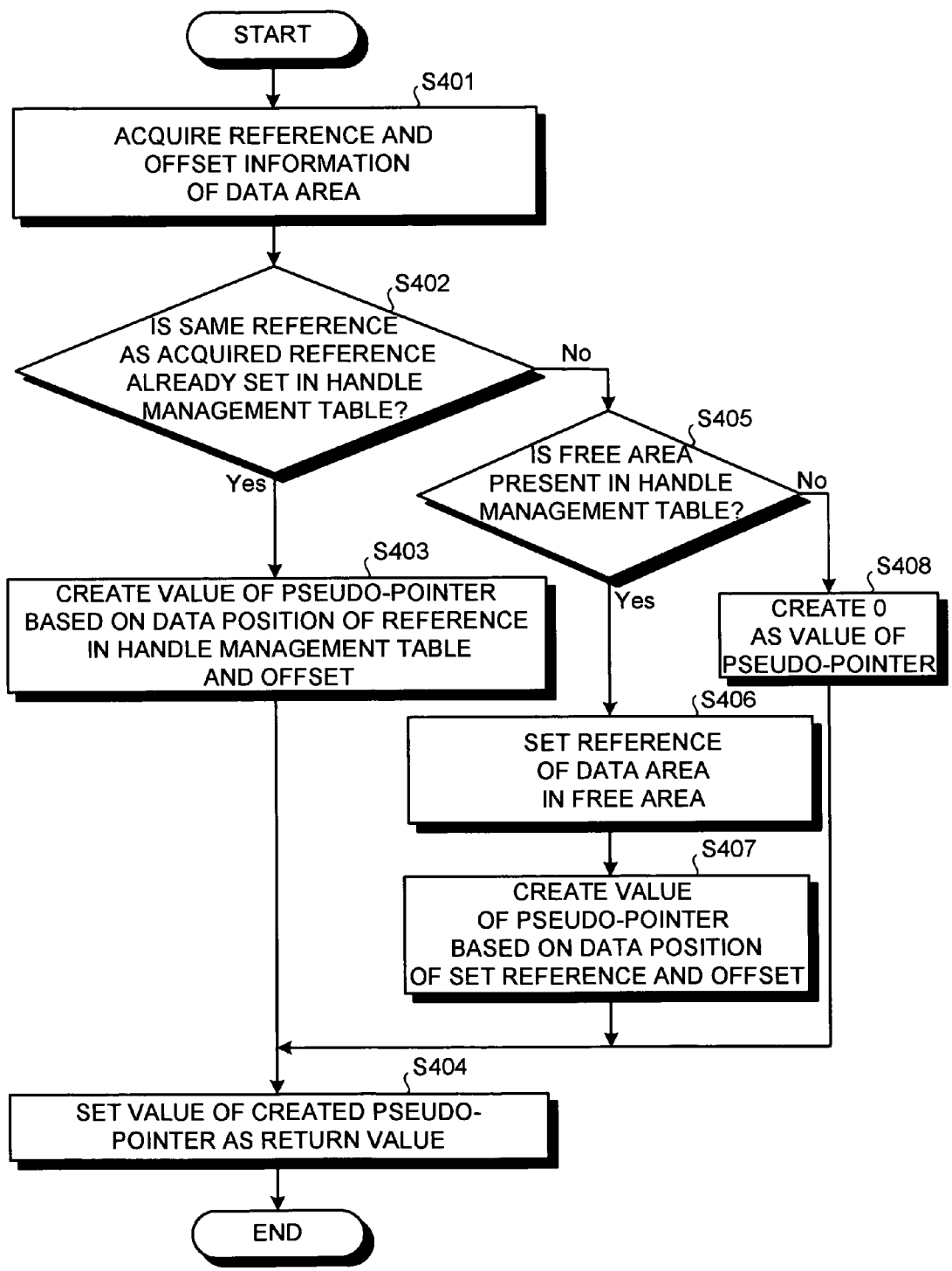
FIG. 14 is a flowchart of a process procedure for creating the pseudo-pointer at the time of executing a program.

A procedure of the process for creating a pseudo-pointer at the time of executing a program is explained below. FIG. 14 is a flowchart illustrating the procedure of the process for creating a pseudo-pointer at the time of executing a program. This process corresponds to the process to be executed by the library explained with reference to FIG. 12.

As illustrated in FIG. 14, the program executing section 43 of the program executing system illustrated in FIG. 4 acquires a reference and offset information of a data area of data for creating a pseudo-pointer (step S401).

The program executing section 43 checks whether the same reference as the acquired reference is already set in the handle management table 46 (step S402).

When the same reference is set (step S402: Yes), the program executing section 43 creates a value of a pseudo-pointer based on the information about the data position of the reference stored in the handle management table 46 (handle information) and the offset information (step S403).

The program executing section 43 sets the value of the created pseudo-pointer as a return value of the library (step S404), and the process ends.

When the same reference as the acquired reference is not set in the handle management table 46 at step S402 (step S402: No), the program executing section 43 checks whether a free area where the reference is set is present in the handle management table 46 (step S405).

When a free area is present (step S405: Yes), the program executing section 43 sets a reference for the data area of the data in the free area (step S406).

The program executing section 43 creates a value of a pseudo-pointer based on the information about the data position of the set reference in the handle management table 46 (handle information) and the offset information about the data area (step S407). The sequence proceeds to step S404, so that the value of the created pseudo-pointer is set as a return value of the library.

When a free area where the reference is set is not present in the handle management table 46 at step S405 (step S405: No), "0" is created as a value of a pseudo-pointer (step S408). The sequence proceeds to step S404, so that the value of the created pseudo-pointer is set as a return value of the library. The value of the pseudo-pointer "0" represents that an error showing insufficient free area has occurred.

A procedure of a process for obtaining reference and offset of data from a pseudo-pointer at the time of executing a program is explained below. FIG. 15 is a flowchart illustrating the procedure of the process for obtaining reference and offset of data from a pseudo-pointer at the time of executing a program. This process corresponds to the process to be executed by the library explained with reference to FIG. 13.

As illustrated in FIG. 15, the program executing section 43 of the program executing system illustrated in FIG. 4 acquires information about a pseudo-pointer of data (step S501). The program executing section 43 acquires position information about a reference of the data set in the handle management table 46 (handle information) and information about offset of the data based on the acquired information about the pseudo-pointer (step S502).

The program executing section 43 checks whether the reference related with a data area of the data is set in the position of the handle management table 46 represented by the position information about the reference acquired from the pseudo-pointer (step S503).

When the reference related with the data area of the data is set (step S503: Yes), the program executing section 43 sets the reference and offset related with the data area of the data as a return value from the library (step S504), and the process ends.

When the reference related with the data area of the data is not set at step S503 (step S503: No), "NULL" as the reference and "0" as the offset are set as the return value from the library (step S505), and the process ends.

"NULL" as the reference and "0" as the offset represents that an error such that the reference related with the data area is not recorded in the handle management table 46 has occurred.

The embodiment is explained above, but the functions of the functioning sections in the system explained in this embodiment can be realized in the following manner. The programs for functioning the functioning sections are recorded into a computer-readable recording medium, and the programs recorded in the recording medium are read into the computer so as to be executed.

FIG. 16 is a block diagram illustrating a hardware configuration of the computer 300 that implements the functions of the system according to the embodiment. The computer 300 is configured so that a central processing unit (hereinafter, "CPU") 310, an input device 320 such as a keyboard and a mouse, a read only memory (hereinafter, "ROM") 330, a random access memory (hereinafter, "RAM") 340, a reading device 350, an output device 360 such as a display or a printer, and a network interface 370 are connected by a bus 380. The CPU 310 executes the programs. The ROM 330 stores various data therein. The RAM 340 stores operation parameters or the like therein. The reading device 350 reads the programs from a recording medium 400 for recording the programs for realizing the functions of the system explained in the embodiment therein. The network interface 370 transmits/receives data with another computer via a network 500 such as the Internet.

The CPU 310 reads the programs recorded in the recording medium 400 via the reading device 350, and executes the programs so as to realize the functions. The recording medium 400 includes an optical disc, a flexible disc, a CD-ROM, a hard disc and the like. The programs may be introduced into the computer 300 via the network 500 such as the Internet.

In the embodiment, the source code reading section 32 of the compiler system illustrated in FIG. 3 reads source codes described by the COBOL, and reads codes related with the pointer operation. In this case, the intermediate code creating section 33 creates codes for the pointer operation using pseudo-pointers having a predetermined data length based on the information about the storage positions in the handle management table 46 where references for identifying respective data are stored and the offset information of the data where the references are stored. The execution code reading section 42 of the program executing system illustrated in FIG. 4 reads execution codes created based on the codes created by the intermediate code creating section 33. The program executing section 43 executes programs for performing the pointer operation using the pseudo-pointers. For this reason, when the compiled programs, which are executed on the platform where the use of the pointer is limited, uses the pointer, the pointer operation can be performed while avoiding the limitation of the use of the pointer.

The information about the storage positions of the references of the respective data recorded in the handle management table 46 and the offset information are used when pseudo-pointers are created. As a result, the data for creating the pseudo-pointers and the pseudo-pointers can have one-to-one correspondence easily.

In the embodiment, the source code reading section 32 of the compiler system illustrated in FIG. 3 reads source codes for the pointer operation using the pseudo-pointers. In this case, the intermediate code creating section 33 acquires the information about the storage positions in the handle management table 46 where the references for identifying the data are stored and the offset information from the pseudo-pointers. At the same time, the intermediate code creating section 33 acquires the information about the references for identifying the data based on the information about the storage positions of the references so as to create codes for setting the acquired information about the references and the offset information as the information about the references and information about offset of the data. For this reason, the information about the references and offset of the data can be easily acquired from the pseudo-pointers, so that the pointer operation can be performed while the limitation in the use of the pointer is avoided.

The embodiment of the present invention is explained above. However, the present invention may be carried out not only in the above embodiment but also in various embodiments within the scope of the technical spirit described in the appended claims.

In the embodiment, for example, the compiling is carried out so that the pseudo-pointers can be used for the source codes described by the COBOL having the command of the pointer operation. The present invention is not, however, limited to this, and the compiling may be carried out so that the pseudo-pointers can be used for source codes described by other languages such as C language having a command of the pointer operation.

In the embodiment, when the pseudo-pointers are created, the head position of the storage area of the reference recorded in the handle management table 46 is acquired as the handle information, and the handle information is set in the top 2-bytes area of the pseudo-pointers. The present invention is not, however, limited to this, and another information about a tail position or the like of the storage area of the reference may be used as long as the information can identify the reference simultaneously.

In the processes explained in the embodiment, all or some of the processes which can be executed automatically can be executed manually, or all or some of the processes which can be executed manually can be executed automatically according to publicly-known methods.

The process procedures, the control procedures, the concrete names, and the information including various data and parameters described in the specification and illustrated in the drawings can be arbitrarily changed unless it is specified otherwise.

The respective components of the systems illustrated in the drawings are functional concepts, and thus it is not always necessary that they are physically configured as illustrated in the drawings. That is, concrete modes of disintegration and integration in the systems are not limited to those in the drawings, and all or some of the components can be functionally or physically disintegrated or integrated in arbitrary units according to various loads and use statuses.

As to the processing functions to be executed in the systems, all or arbitrary some of them can be realized by a CPU and a program which is analyzed and executed by the CPU, or realized as a hardware using wired logic.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores a compiler program which compiles source codes made for a first environment where a command for performing a pointer operation can be directly executed into execution codes for a second environment where a command for performing a pointer operation cannot be directly executed, the compiler program making a computer execute:
   a source code reading procedure of reading the source codes; and
   a code creating procedure of, when a source code, which is related with a pointer operation to be performed for storing a pointer indicating a position in data into a pointer variable, is read by the source code reading procedure, creating a code for performing the pointer operation by storing a pseudo-pointer into the pointer variable;
   wherein the pseudo-pointer includes an address of a reference for identifying the data among a plurality of data in a table storing the reference and offset information for specifying the position in the data identified by the reference, and has a same data length with a pointer variable used, if the source code is compiled for the first environment, to store the pointer.

2. The computer-readable recording medium according to claim 1, wherein when the source code for performing the pointer operation using the pseudo-pointer is read by the source code reading procedure, the code, which is for acquiring the address of the references for identifying the data and the offset information from the pseudo-pointer and for acquiring information about references for identifying the data based on the information specified by the reference for identifying the data so as to set the acquired address of the reference and the offset information as the information about the references of the data and the offset information, is created by the code creating procedure.

3. The computer-readable recording medium according to claim 1, wherein the address of the reference for identifying the data is information related to storage positions in a reference storage area where the references for identifying the data are stored.

4. A method of compiling source codes, made for a first environment where a command for performing a pointer operation can be directly executed into execution codes for a second environment where a command for performing a pointer operation cannot be directly executed, comprising:
   a source code reading procedure of reading the source codes; and
   a code creating procedure of, when a source code, which is related with a pointer operation to be performed for storing a pointer indicating a position in data into a pointer variable, is read by the source code reading procedure, creating a code for performing the pointer operation by storing a pseudo-pointer into the pointer variable;
   wherein the pseudo-pointer includes an address of a reference for identifying the data among a plurality of data in a table storing the reference and offset information for specifying the position in the data identified by the reference, and has a same data length with a pointer variable used, if the source code is compiled for the first environment, to store the pointer.

5. A program processing system that compiles source codes made for a first environment where a command for performing a pointer operation can be directly executed into execution codes for a second environment where a command for performing a pointer operation cannot be directly executed and executes programs based on execution codes obtained by the compiling, comprising:

a source code reading unit that reads the source codes;

a code creating unit that, when the source code reading unit reads a source code related with a pointer operation to be performed for storing a pointer indicating a position in data into a pointer variable, creates a code for performing the pointer operation by storing a pseudo-pointer into the pointer variable;

an execution code reading unit that reads an execution code created based on the code created by the code creating unit;

a program executing unit that, when the execution code reading unit reads the execution code, executes a program for performing the pointer operation using the pseudo-pointer; and a processor controlling the source code reading unit, the code creating unit, the execution code reading unit, and the program executing unit, wherein the pseudo-pointer includes an address of a reference for identifying the data among a plurality of data in a table storing the reference and offset information for specifying the position in the data identified by the reference, and has a same data length with a pointer variable used, if the source code is compiled for the first environment, to store the pointer.

* * * * *